Inventor,
Franklin R. D'Entremont,
by Francis K. Doyle
His Attorney.

3,353,132
LEAKAGE FLUX SUPPRESSOR WINDINGS FOR TRANSFORMERS

Franklin R. D'Entremont, Dover, N.H., assignor to General Electric Company, a corporation of New York
Filed May 27, 1965, Ser. No. 459,213
1 Claim. (Cl. 336—155)

This invention relates to transformer cores and more particularly to leakage flux suppressor windings for transformer cores.

As is well known to those skilled in the transformer art, many transformers, such as instrument transformers, are connected in circuit in the vicinity of other conductors. As is also well known, a conductor carrying current in close proximity to a magnetic core produces an electromagnetic flux in such core. This flux causes the section of the core closest to the conductor to operate at a different and usually higher flux density than would be obtained if the conductor were spaced some distance from the core. This extraneous flux is usually termed "leakage flux." Of course, the greater the current flowing in the conductor and the closer the conductor is to the core the larger will be the leakage flux entering the core. As will be understood, the leakage flux tends to increase the exciting current required to produce the normal flux needed for operation of the core in a transformer.

In the case of instrument transformers, leakage flux from an adjacent conductor can seriously impair the accuracy of the transformer. For example, an increase in exciting current will increase the ratio and phase angle error of current transformers. This is particularly true where the adjacent conductor is operating under overcurrent conditions and may carry a large current such as, for example, 20,000 amperes. From this it will be apparent that there is currently a need in the magnetic core art, and particularly cores used in instrument transformers, to provide a core and coil construction which will reduce the effect of leakage flux in such cores.

It is, therefore, one object of this invention to provide a core and coil construction which will reduce the effect of leakage flux from adjacent conductors.

A further object of this invention is to provide a core and coil construction which will equalize the flux in all sections of the core when such core is subjected to leakage flux from adjacent conductors.

A still further object of the invention is to provide a core and coil construction which will prevent localized saturation of the core in areas near adjacent conductors.

In carrying out this invention in one form, a magnetic core is provided with auxiliary flux suppressor windings. The suppressor windings are wound about the core and connected to cause current flow in the windings which will produce a magnetomotive force in the core which will oppose the magnetomotive force causing the leakage flux.

The invention which is sought to be protected will be particularly pointed out and distinctly claimed in the claim appended hereto. However, it is believed that this invention and the manner in which its various objects and advantages are obtained, as well as other objects and advantages thereof, will be better understood from the following detailed description of a preferred embodiment thereof, particularly when considered in the light of the accompanying drawings, in which:

According to this invention, suppressor or equalizing windings are wound about a magnetic core. The suppressor windings are wound about the core and connected in a manner so that any leakage flux from an adjacent current-carrying conductor will produce a voltage in the same direction in the coils. The voltage produced in the coils by such leakage flux will produce a current which will oppose the leakage flux producing it. Further, the normal or operating flux of the core will produce voltages in the suppressor windings that are in opposition so that the normal flux will not produce any current in the suppressor windings.

Figure 1:
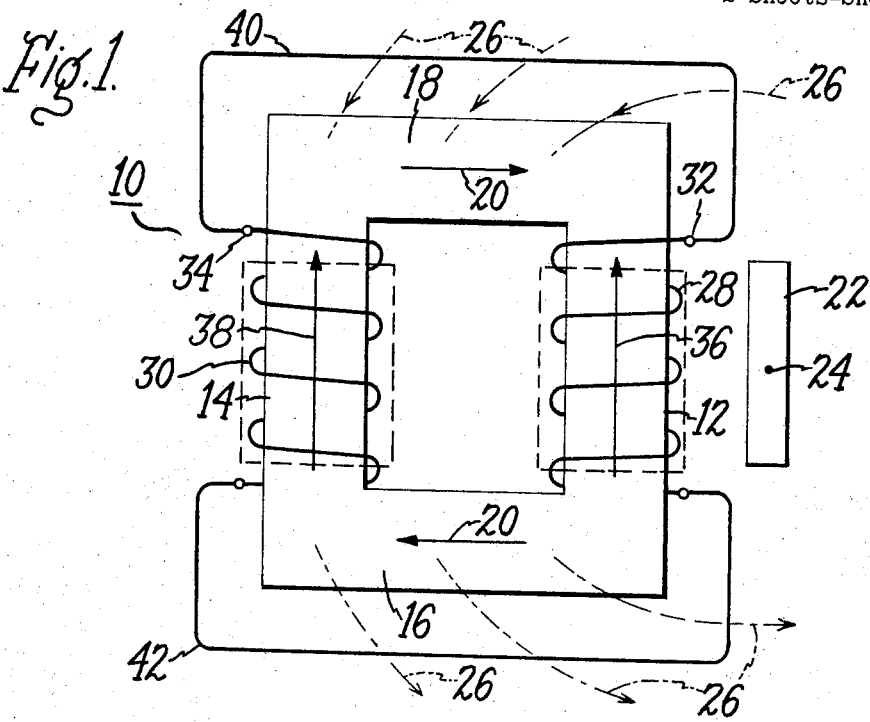
FIGURE 1 shows a laminated shell-type core with flux suppressor windings thereon in accordance with one form of this invention.

Referring now to FIG. 1 of the drawing, a shell-type core 10 is shown. Core 10 comprises the winding legs 12 and 14 and the yoke members 16 and 18 forming a closed magnetic core, in a manner well understood by those skilled in the art. The core 10 will be provided with normal primary and secondary windings (not shown) such that during operation of core 10 as a transformer a normal flux will be produced in the magnetic core 10 in a clockwise direction as is indicated by arrow 20 in yoke members 16 and 18. The normal primary and secondary windings are not shown on core 10 to prevent confusion in the drawings since such windings are well understood by those skilled in the art.

A current-carrying conductor 22 is shown adjacent to core 10. As will be understood, when current flows in conductor 22 in a direction out from the plane of the drawing, conventionally indicated by dot 24, a flux will be produced about conductor 22 in a counterclockwise direction. This flux is indicated by the arrowed flux lines 26. Of course, should current be flowing in the opposite direction, that is, into the plane of the drawings, then the flux generated would be in the opposite direction. Where the flux, indicated by lines 26, enters core 10 it is a leakage flux. As will be understood, the leakage flux will increase the flux density in winding leg 12, while decreasing the flux in winding leg 14. That is, the leakage flux is in the same direction as the normal flux in winding leg 12 and opposes the normal flux in winding leg 14. As will be apparent the effect of the leakage flux is to cause winding leg 12 to operate with more than normal flux, and if large enough will actually saturate winding leg 12. Winding leg 14 will require a greater exciting current to produce sufficient normal flux in opposition to the leakage flux for operation of the core 10.

In order to reduce the effect of the leakage flux, represented by arrowed lines 26, flux suppressor or equalizing windings are wound about the core 10. In the form of the invention shown in FIG. 1, two suppressor windings 28 and 30 are shown. Suppressor winding 28 is wound about the winding leg 12 while suppressor winding 30 is wound about the winding leg 14. As shown, the windings 28 and 30 are wound in opposite directions, winding 28 essentially being wound in a clockwise direction starting at 32 about the leg 12, while winding 30 is essentially wound in a counterclockwise direction starting at end 34 about winding leg 14. As will be apparent, the flux indicated by arrowed lines 26 will produce a voltage and current in winding 28 which will produce a flux in winding leg 12 in the opposite direction to the leakage flux. This flux is indicated by the arrow 36. As will be apparent, the flux produced by suppressor winding 28 will oppose the leakage flux and will, therefore, effectively reduce the effect of the leakage flux in winding leg 12. In a similar manner the voltage and current produced in winding 30 will generate a flux in winding leg 14 which will oppose the leakage flux in that winding leg. Thus it can be seen that by use of suppressor windings 28 and 30 on the winding legs 12 and 14 the effect of the leakage flux, due to an adjacent conductor, such as 22, may be substantially reduced in core member 10.

The starting ends 32 and 34 of windings 28 and 30 are connected together as indicated at 40 while the finish of windings 28 and 30 are connected together as indicated at 42. Thus it will be seen that as to the normal flux in core 10 suppressor windings 28 and 30 are connected in opposition so that any voltage produced in the windings by the normal flux in core 10 will oppose each other and, therefore, no current will be produced in windings 28 and 30. Thus it will be apparent that suppressor windings may be added to core member 10, in the manner indicated, which will effectively reduce any effect of leakage flux while at the same time having no effect on the normal operation of the core.

Figure 2:
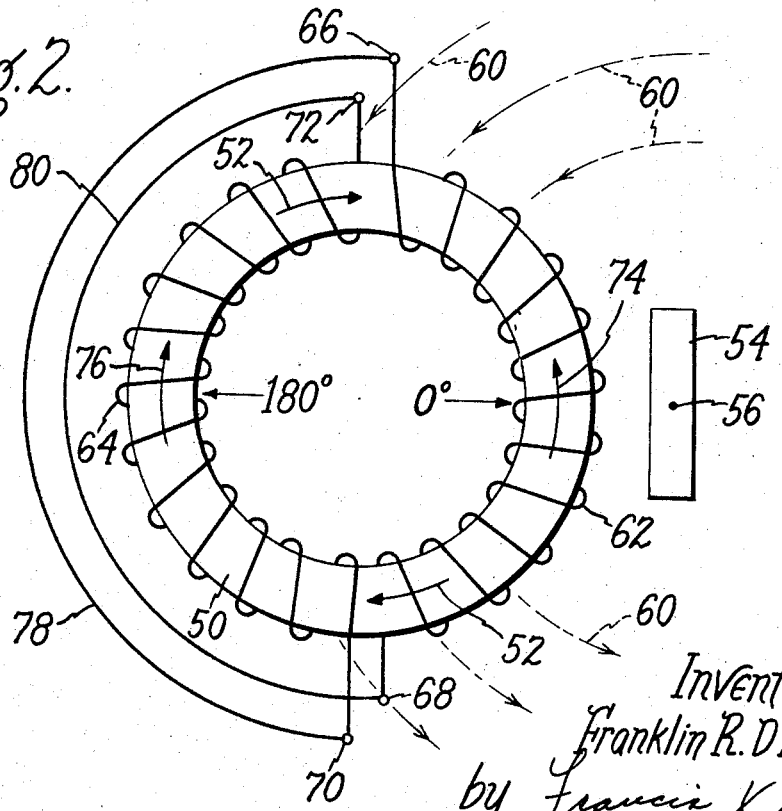
FIGURE 2 shows a wound laminated core with flux suppressor windings thereon in accordance with this invention.

Referring now to FIG. 2 of the drawings, a laminated wound core member 50 is shown. The core member 50 will be provided with primary and secondary windings (not shown) so as to generate a normal flux in the core in a clockwise direction as indicated by arrows 52. A current-carrying conductor 54 is shown adjacent the transformer with the current flowing out from the plane of the paper as indicated by dot 56. This will generate a leakage flux in a counterclockwise direction as indicated by the arrowed lines 60. Suppressor windings are provided on core 50 to substantially reduce the effect of leakage flux in the core. In FIG. 2 the suppressor windings are shown as windings 62 and 64, each being wound substantially about one-half of core 50. As shown, winding 62 starts at 66 and is wound in a counterclockwise direction about core 50 to end 68. Winding 64 starts at 70 and is wound in a clockwise direction about the other half of the core ending at 72. As will be apparent, winding 62 will generate a flux in its portion of core 50 in a counterclockwise direction indicated by arrow 74 which will oppose the leakage flux in that portion of core 50. Suppressor winding 64 will generate a flux in its portion of the core in a clockwise direction as indicated by arrow 76. Thus, each of the suppressor windings 62 and 64 will produce a flux in the core 50 in a direction so as to oppose the leakage flux produced by the current-carrying conductor 56. As is indicated in FIG. 2, the start points 66 and 70 of windings 62 and 64 are connected together by a conductor 78, while the finish points 68 and 72 of the windings are connected by a conductor 80. In this manner windings 62 and 64 are connected such that the voltage produced in winding 62 and winding 64 by the normal flux of core 50 will be in opposition and no current will flow in the windings 62 and 64 due to the normal flux in core 50.

Of course, it will be apparent that more suppressor windings could be added to a wound core as is desired. For example, 3 or 4 suppressor windings could be added, the 3 windings each being wound about approximately 120° of the core while the 4 windings would each be wound about approximately 90° of the core. In all cases, the windings would be wound and connected so as to generate a flux in the core in opposition to any leakage flux. However, they would be wound in opposition such that the normal flux of the core would produce opposing voltages in the windings thereby preventing any current flow in the suppressor windings.

Figure 3:
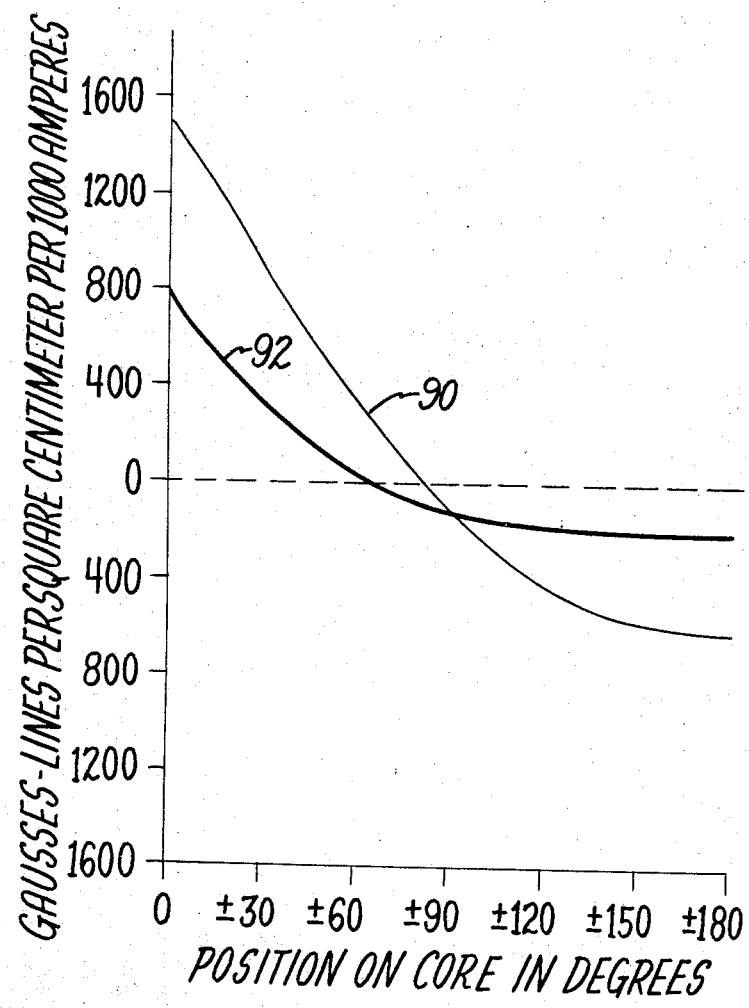
FIGURE 3 shows the effect of the suppressor windings of this invention on a wound core such as is shown in FIG. 2.

FIGURE 3 of the drawings shows curves indicating the effectiveness of suppressor windings according to this invention in reducing the effect of leakage flux on a wound core from an adjacent conductor. The tests were conducted on a wound core similar to that shown in FIGURE 2, with the adjacent conductor in the position shown in FIGURE 2. The flux measurements were taken about the core, the zero degree position being that portion of the core directly adjacent the conductor 54, while the 180 degree position was on the opposite side of the core, as indicated in FIGURE 2. Curve 90 in FIGURE 3 shows the leakage flux due to an adjacent conductor without suppressor windings. As can be seen, at the zero degree position the leakage flux in the core is almost 1,600 gausses per square centimeter for each 1,000 amperes of current in the adjacent conductor. At the 180 degree position the leakage flux is approximately 600 gausses per square centimeter for each 1,000 amperes of current in the adjacent conductor. When suppressor windings are placed on the core in the manner disclosed in this invention the effect of leakage flux from an adjacent conductor is substantially reduced. This is shown by curve 92 of FIGURE 3. From curve 92 it can be seen that the leakage flux at the zero degree position has been reduced to approximately 800 gausses per square centimeter for each 1,000 amperes of current in the adjacent conductor. In a similar manner, at the 180 degree position the leakage flux is less than 200 gausses per square centimeter for each 1,000 amperes of current in the adjacent conductor. Thus, the suppressor windings of this invention reduced the effect of the leakage flux by approximately fifty percent in the tests shown by FIGURE 3.

From the above description of the invention it is apparent that by use of flux suppressor or equalizing windings that the effect of leakage flux on magnetic cores may be substantially reduced. While there has been shown and described the present preferred embodiments of the invention it will be apparent to those skilled in the art that various modifications may be made without departing from the spirit and scope of the invention, particularly as defined in the appended claim.

What is claimed as new and which it is desired to secure by Letters Patent of the United States is:

In a core and coil construction having coils wound about a core member for operation as a transformer, the improvement of means for reducing the effect of leakage flux in the core member from adjacent conductors, said leakage flux reducing means comprising
  (a) at least two flux suppressor windings wound on the core member,
    (1) said flux suppressor windings connected together and wound in opposition such that normal flux in the core will produce opposing voltages in said flux suppressor windings,
    (2) said flux suppressor windings mounted in the flux field of adjacent conductors,
    (3) said flux field of adjacent conductors producing a voltage and current in said flux suppressor windings which will produce a flux in the core member in opposition to the leakage flux produced in the core member by the adjacent conductors.

References Cited

UNITED STATES PATENTS

| | | | |
|---|---|---|---|
| 1,619,753 | 3/1927 | Owen | 336—184 X |
| 1,706,139 | 3/1929 | Boyajion et al. | 336—171 X |
| 1,724,935 | 8/1929 | Huet | 336—184 X |
| 1,785,819 | 12/1930 | Silent | 336—229 X |
| 2,375,593 | 5/1945 | Sontheimer et al. | 336—181 X |
| 2,695,384 | 11/1954 | Stuart | 336—155 X |
| 2,975,384 | 3/1961 | Geiser | 336—229 X |
| 3,164,811 | 1/1965 | Boylon et al. | 336—181 X |

LEWIS H. MYERS, *Primary Examiner.*

T. J. KOZMA, *Assistant Examiner.*